（12）United States Patent
Kaupert et al.

(10) Patent No.: US 9,722,424 B2
(45) Date of Patent: Aug. 1, 2017

(54) ARRANGEMENT COMPRISING A FUEL CELL SYSTEM

(75) Inventors: Andreas Kaupert, Esslingen (DE);
Valentin Notemann, Sonthofen (DE);
Karsten Reiners, Esslingen (DE);
Markus Willkommen, Stuttgart (DE)

(73) Assignee: Eberspächer Climate Control Systems GmbH & Co. KG, Esslingen (DE)

( * ) Notice: Subject to any disclaimer, the term of this patent is extended or adjusted under 35 U.S.C. 154(b) by 407 days.

(21) Appl. No.: 14/232,022

(22) PCT Filed: Jul. 9, 2012

(86) PCT No.: PCT/EP2012/063381
§ 371 (c)(1),
(2), (4) Date: Mar. 12, 2014

(87) PCT Pub. No.: WO2013/007681
PCT Pub. Date: Jan. 17, 2013

(65) Prior Publication Data
US 2014/0375117 A1   Dec. 25, 2014

(30) Foreign Application Priority Data

Jul. 13, 2011 (DE) .......................... 10 2011 079 104
Jul. 14, 2011 (DE) .......................... 10 2011 079 169
Dec. 14, 2011 (DE) .......................... 10 2011 088 563

(51) Int. Cl.
*H01M 8/00* (2016.01)
*H02J 1/10* (2006.01)
(Continued)

(52) U.S. Cl.
CPC ........... *H02J 1/102* (2013.01); *B60L 11/1868* (2013.01); *B60L 11/1885* (2013.01);
(Continued)

(58) Field of Classification Search
None
See application file for complete search history.

(56) References Cited

U.S. PATENT DOCUMENTS 7,410,016 B2 *   8/2008   Schumann .............. F23C 13/00
                                                        180/65.1
2002/0028362 A1*  3/2002   Prediger ........... H01M 8/04388
                                                        429/429
(Continued)

FOREIGN PATENT DOCUMENTS

DE        202 05 813 U1    2/2003
DE        101 27 892 A1   10/2003
(Continued)

OTHER PUBLICATIONS

Datta B K et al.: "Fuel Cell Power Source for a Cold Region", Journal of Power Sources, Elsevier SA, CH, vol. 106, No. 1-2, Apr. 1, 2002, pp. 370-376.
(Continued)

*Primary Examiner* — Rexford Barnie
*Assistant Examiner* — Swarna N Chowdhuri
(74) *Attorney, Agent, or Firm* — McGlew and Tuttle, P.C.

(57) ABSTRACT

A system (0) includes an electrical load system (54) with a load network battery (82), and a fuel cell system (1). Operation is simplified, especially during start of the fuel cell system (1) if the fuel cell system (1) has a system battery (56). A system voltage across the system battery (56) can be supplied to electrical system loads (80) of the fuel cell system (1) and, via a load voltage converter (77) and at least one additional voltage converter (86), to the load system (54) and secondary electrical loads (84, 85).

20 Claims, 2 Drawing Sheets

(51) Int. Cl.
  *B60L 11/18*   (2006.01)
  *H01M 8/04014* (2016.01)
  *H01M 8/0612*  (2016.01)
  *H01M 10/46*   (2006.01)
  *H01M 16/00*   (2006.01)
  *H02J 7/34*    (2006.01)
  *H02J 1/00*    (2006.01)

(52) U.S. Cl.
  CPC ....... *B60L 11/1887* (2013.01); *B60L 11/1894* (2013.01); *H01M 8/00* (2013.01); *H01M 8/04022* (2013.01); *H01M 8/0618* (2013.01); *H01M 8/0625* (2013.01); *H01M 8/0631* (2013.01); *H01M 10/46* (2013.01); *H01M 16/006* (2013.01); *H02J 7/34* (2013.01); *H01M 2250/20* (2013.01); *H02J 2001/004* (2013.01); *Y02E 60/50* (2013.01); *Y02T 10/7066* (2013.01); *Y02T 90/32* (2013.01); *Y02T 90/34* (2013.01); *Y10T 307/516* (2015.04)

(56) References Cited

U.S. PATENT DOCUMENTS

| | | | |
|---|---|---|---|
| 2004/0083039 A1* | 4/2004 | Hunt | B60L 11/1887 701/22 |
| 2007/0009770 A1* | 1/2007 | Takada | H01M 16/006 429/9 |
| 2008/0259660 A1* | 10/2008 | Wang | H02J 7/34 363/65 |

FOREIGN PATENT DOCUMENTS

| | | |
|---|---|---|
| DE | 10 2005 002 506 A1 | 7/2006 |
| DE | 10 2009 030 236 A1 | 12/2010 |
| EP | 1 962 407 A2 | 8/2008 |

OTHER PUBLICATIONS

Fontela et al.: "Airport Electric Vehicle Powered by Fuel Cell", Journal of Power Sources, Elsevier SA, CH, vol. 169, No. 1, May 11, 2007, pp. 184-193.

* cited by examiner

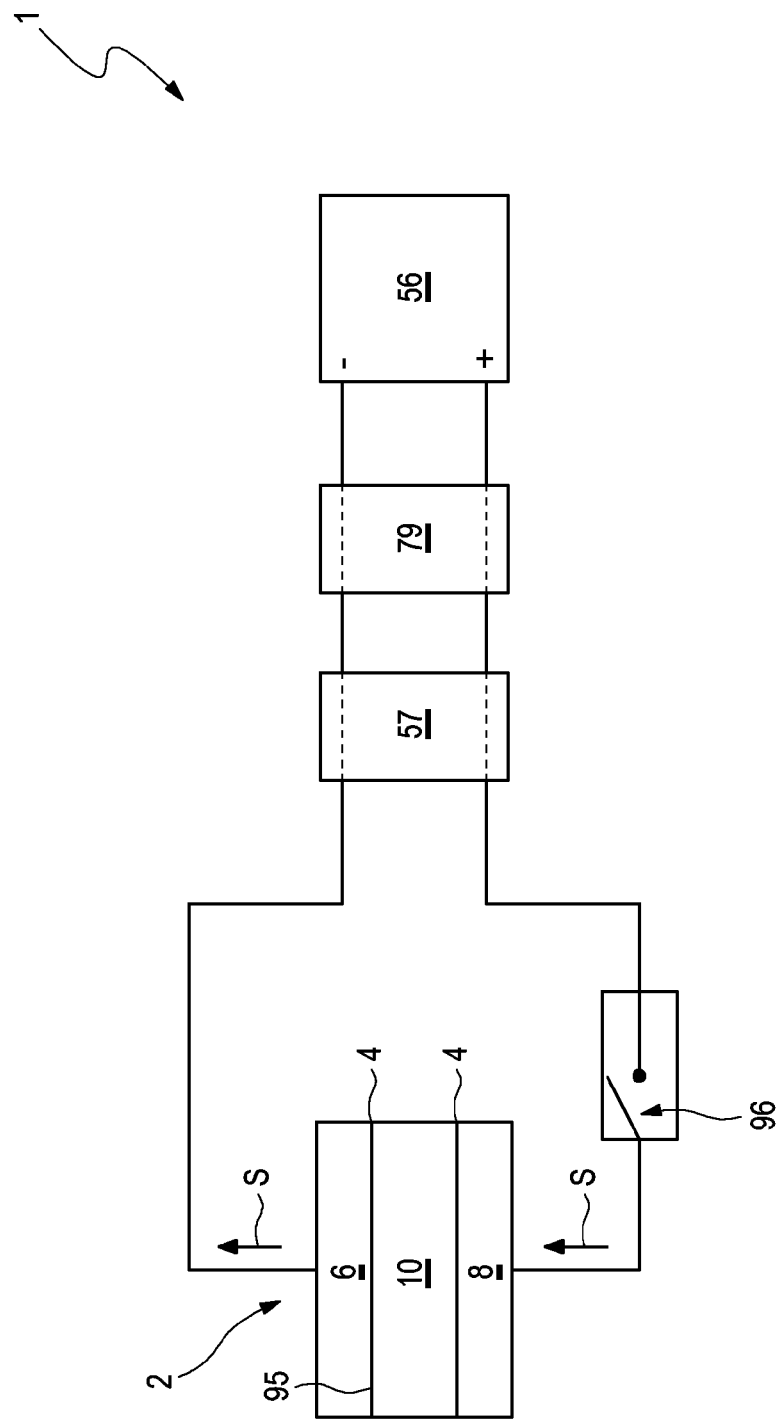

000000
ARRANGEMENT COMPRISING A FUEL CELL SYSTEM

CROSS REFERENCE TO RELATED APPLICATIONS

This application is a United States National Phase Application of International Application PCT/EP2012/063381 filed Jul. 9, 2012 and claims the benefit of priority under 35 U.S.C. §119 of German Patent Application DE 10 2011 079 104.3 filed Jul. 13, 2011, and German Patent Application DE 10 2011 079 169.8 filed Jul. 14, 2011, and German Patent Application DE 10 2011 088 563.3 filed Dec. 14, 2011, the entire contents of which are incorporated herein by reference.

FIELD OF THE INVENTION

The present invention relates to an arrangement comprising a fuel cell system. The invention furthermore relates to such a fuel cell system.

BACKGROUND OF THE INVENTION

The use of fuel cells in different applications, for example in a vehicle or a stationary application is thoroughly known. A fuel cell system thereby supplies electrical loads with electrical energy. To this end, the fuel cell system comprises a fuel cell, which for example is formed as a stack. The fuel cell generates an electrical voltage making use of the chemical reaction of a cathode gas and an anode gas, wherein as cathode gas oxygen-containing gases, in particular air, are usually used, while hydrogen-containing gases are employed as anode gas as a rule. In many applications, the fuel cell system is part of an arrangement, wherein the arrangement frequently comprises an electrical load system, in which different electrical loads or first loads are supplied with an electrical voltage. To this end, the load system comprises in particular a load network battery. Here, as a rule, the voltage of the load network and the electrical voltage generated by the fuel cell are at different voltage levels. In other words, this means that while a load network voltage of the load system, in particular of the load network battery, is at a load network voltage level, the cell voltage of the fuel cell has a cell voltage level that differs from the load network voltage level. The fuel cell system itself comprises a plurality of electrical loads or system loads such as for example a blower, control valves and a control unit. Since the fuel cell during a starting operation of the fuel cell system cannot provide electrical energy directly, the fuel cell system during the starting operation requires an external energy supply for supplying the system loads.

Such a fuel cell system is known for example from DE 10 2009 030 236 A1.

SUMMARY OF THE INVENTION

The present invention deals with the problem of stating an improved or at least alternative embodiment for an arrangement comprising a fuel cell system, which is characterized in particular by an independent starting of the fuel cell system.

According to the invention, an arrangement is provided comprising a fuel cell system and an electrical load system. The load system is for the electrical supply of first loads and comprises a load network battery with a load network voltage at a network load voltage level. The fuel cell system comprises a fuel cell for generating an electrical cell voltage at a cell voltage level. The fuel cell system is for supplying electrical system loads of the fuel cell system and comprises a system battery with a system voltage at a system voltage level. The load network load voltage level and the system voltage level are different. The fuel cell system comprises a voltage converter device for converting the cell voltage level to the system voltage level and/or of the system voltage level to the cell voltage level. For supplying electrical secondary loads, at least one additional voltage converter is provided for adapting the system voltage across the system battery to at least one additional voltage level. The system voltage level and the additional voltage level are different. For supplying the load system, at least one load voltage converter is provided for adapting the system voltage across the system battery to the load network voltage level.

The present invention is based on the general idea of equipping a fuel cell system of an arrangement with at least one system battery that differs from a load network battery of a load system of the arrangement, wherein the system battery has an electrical system voltage at a system voltage level. In this case, the system battery functions in particular as a storage unit or as a buffer between a fuel cell of the fuel cell system and electrical loads of the fuel cell system or of the arrangement, wherein the fuel cell generates a cell voltage at a cell voltage level by means of fuel cell elements. Supplementing the fuel cell system through the system battery now particularly results in that the system voltage made available by the system battery can be supplied to system loads, i.e. electrical loads of the fuel cell system. Starting of the fuel cell system for example without supplying external electrical energy can thereby also be carried out. If the fuel cell system has a solid oxide fuel cell (SOFC), in particular heating-up of the constituent parts of the fuel cell system, in particular the heating-up of electrodes or an anode and/or a cathode of the fuel cell, during the starting operation is possible without external supply of electrical energy or the electrical energy required for the starting operation is reduced. If the fuel cell system has a low-temperature fuel cell, for example PEM-fuel cell, the starting operation, in particular supplying the system loads with electrical voltage, can be realized without external supply of electrical energy. In addition, the system voltage can also be supplied to other electrical loads, in particular the load system of the arrangement and thus first loads.

According to the inventive idea, the fuel cell system comprises a voltage converter device, which converts the cell voltage level to the system voltage level and/or the system voltage level to the cell voltage level. The voltage converter device thus serves in particular the purpose of rendering the cell voltage generated by the fuel cell suppliable to the system battery. Alternatively or additionally, the voltage converter device can render the system voltage across the system battery suppliable to the fuel cell. To this end, the voltage converter device is practically electrically connected to the fuel cell and the system battery, wherein the respective electrical connections do not necessarily run directly from the voltage converter device to the fuel cell or to the system battery. This means in particular that other devices or components can be connected between the fuel cell, the voltage converter device and the system battery. In this case, the term load system does not at all mean that the load system does not have an energy supply or electrical voltage supply that is separate from the fuel cell system. The load system can rather comprise an energy supply that differs from the fuel cell system or be connected to such a supplier.

The electrical connection with the fuel cell is preferentially and practically realized by means of the electrodes of the fuel cell. Accordingly, the cell voltage is tapped off the electrodes of the system voltage preferentially supplied to the electrodes.

As system loads of the fuel cell system, an air supply device, a fuel supply device, a heater, a control unit as well as a valve of the fuel cell system are exemplarily pointed out here.

To supply secondary electrical loads, i.e. also loads which do not belong to the arrangement, the system battery is additionally connected to at least one additional voltage converter, wherein the respective additional voltage converter adapts the system voltage across the system battery to an associated additional voltage level. The respective additional voltage level can be above or below the system voltage. The respective additional voltage converter makes available the associated additional voltage at the associated additional voltage level available to the secondary load or the secondary loads, wherein the respective additional voltage level is above or below the system voltage level.

For the electrical supply of the load network a load voltage converter that is electrically connected to the system battery is additionally provided, which adapts the system voltage across the system battery to the load network voltage level. The load voltage converter consequently serves the purpose of making the electrical voltage generated by the fuel cell system available to the load system. The load network voltage level is above or below the system voltage level, wherein the load voltage converter increases or reduces the system voltage level to the load network voltage level.

It is pointed out that the cell voltage generated by the fuel cell and the system voltage across the system battery are d.c. voltages as a rule. Accordingly and practically, the system loads are suitable for operation with a d.c. voltage. Thus, the voltage converter device preferentially comprises at least one d.c. voltage converter, i.e. in particular a so-called "DC/DC-converter". If the load network voltage is also a d.c. voltage, the load voltage converter can likewise comprise such a d.c. voltage converter.

It is noted, furthermore, that the fuel cell as a rule is formed as a stack of fuel cell elements. The cell voltage of the fuel cell in a series connection of the individual fuel cell elements is consequently obtained as the sum of the electrical voltage generated by the individual fuel cell elements. If the cell voltage in an embodiment of the arrangement amounts to for example 42V and the respective fuel cell element generates an electrical voltage of 0.7V, the fuel cell comprises 60 fuel cell elements connected in series. The electrical voltage generated by the respective fuel cell however depends among other things on the output, i.e. on a load. If the voltage of the respective fuel cell element with a full load for example drops to 0.6V, the cell voltage accordingly is reduced to 36V. If the voltage of the respective fuel cell system while idle, i.e. without load, increases to 1.0V, the cell voltage accordingly rises to 60V. The voltage converter device thus also serves in particular the purpose of balancing these fluctuations of the cell voltage and converting the load-dependent cell voltage and thus the load-dependent cell voltage system into the substantially constant system voltage level.

Preferred is an embodiment, in which the load network battery, similar to the system battery, functions as a storage unit or as a buffer, by means of which the first loads are electrically supplied.

According to a further preferred embodiment, the fuel cell system comprises an electrical charging device. The combustion engine serves in particular the purpose of charging the system battery by means of the electrical cell voltage generated by the fuel cell. The charging device thus allows in particular storing the electrical energy generated by the fuel cell by means of the system battery. The electrical energy thus stored is now in particular during a starting operation of the fuel cell system suppliable to the system loads, by way of which a starting of the fuel cell system that is independent of the outside, i.e. independent of external voltage or electrical energy suppliers is ensured. In this case, the charging device is preferentially arranged between the voltage converter device and the system battery. The charging device can also be arranged within the voltage converter device or be part of the voltage converter device. Alternatively, the charging device can also be arranged on the system battery or be a part of the system battery.

In a further preferred embodiment, at least one of the additional voltage converters comprises an inverter. At least one of the additional voltage converters is consequently designed in such a manner that it adapts the d.c. voltage-like system voltage across the system battery to the corresponding additional voltage level and into an a.c. voltage. This now serves in particular for the electrical supply of secondary loads, which are operated with an a.c. voltage. The secondary loads in this case can be external loads, which are operated with usual domestic voltages. The additional voltage thus amounts to in particular 220V or 110V. As examples for such secondary loads, reference is made to refrigerators or cooler boxes, TV sets or displays as well as electrically operated air-conditioning devices, in particular air-conditioning compressors.

The respective additional voltage levels can be both below as well as above the system voltage level. Embodiments are conceivable for example, in which an additional voltage level each is above and an additional voltage level below the system voltage level. Accordingly, the arrangement comprises two additional voltage converters, wherein one of the additional voltage converters increases the system voltage level to the first additional voltage level and thus renders the first additional voltage suppliable to first secondary loads while the second additional voltage converter reduces the system voltage level to the second additional voltage level, rendering it suppliable to the second secondary loads. Embodiments are also preferred, in which at least one such additional voltage converter increases the system voltage level to an additional voltage level with a high voltage. Such a high voltage serves for example for the operation of air-conditioning devices.

Embodiments are also conceivable, in which such an additional voltage converter merely comprises an inverter of said type. This additional voltage converter also converts the system voltage across the system battery merely into an a.c. voltage.

In a further preferred embodiment, the system voltage across the system battery is suppliable to electrodes of the fuel cell and thus the anode of the fuel cell. Supplying the system voltage across the system battery to the fuel cell in particular serves the purpose of protecting the electrodes and in particular the anode from oxidation. This so-called "protective voltage", as is known for example from US 2002/0028362 A1, is practical in particular if the anode is exposed to oxidizing conditions. To this end, the fuel cell system, in particular the voltage converter device, is designed in such a manner that the system voltage or the system voltage level is suppliable to the electrodes of the fuel cell. Supplying the system voltage to the electrodes or to the anode is preferentially controllable and regulatable. Such a transfer of the system voltage to the electrodes can thus be activated and subsequently deactivated again in particular when required, for example during the start or shutting down of the fuel cell system. The voltage converter device is additionally designed optionally in such a manner that it can convert the system voltage at the system voltage level into an electrical voltage at another electrical voltage level. This now serves the purpose in particular of adapting the voltage to be supplied to the electrodes to the respective conditions, in particular the oxidizing conditions on the anode side. To this end, the fuel cell system preferentially comprises a device, which allows determining the relevant conditions on the electrodes and in particular on the anode side. Such a device can in particular comprise a temperature measurement device and a device for determining the oxygen concentration or the oxygen ion concentration. In addition, a control device can be provided, which regulates and controls the protective voltage independently of the corresponding parameters.

It is pointed out that supplementing the fuel cell system through the voltage converter device and the load voltage converter as well as the at least one additional voltage converter also increases the economy of the fuel cell system or the associated arrangement. This is the case in particular because these constituent parts of the invention are thoroughly known and allow simple and cost-effective assembly or production.

In a preferred embodiment, the arrangement is part of a vehicle, in particular of a motor vehicle. In this case, the load system can correspond to an electrical system of the vehicle. Thus, the first loads are in particular control units, light bulbs as well as a radio of the vehicle. Consequently, the load network battery is a battery of the motor vehicle's electrical system. The cell voltage generated in an application in a vehicle as a rule is between 42 and 100V, while the system voltage preferentially has a value of 24V, as a consequence of which the system loads are also operated at a system voltage level of 24V. Furthermore, the voltage of the vehicle's electrical system as a rule has a value of 12V, as a consequence of which the initial loads are operated at a load network voltage level of 12V. In this case, the voltage converter device converts the cell voltage generated by the fuel cell to the system voltage level of 24V and supplies the converted voltage to the system battery. Furthermore, the load voltage converter in this case converts the system voltage of 24V to the load network voltage level of 12V and supplies the converted voltage to the vehicle's electrical system, in particular to the vehicle's electrical system battery. The load voltage converter is thus designed in particular as a step-down converter. In this case, the vehicle's electrical system battery functions similar to the system battery as a storage unit or as a buffer, out of which the first loads can be electrically supplied. Converting the system voltage to the high-voltage level or into an a.c. voltage through an additional voltage converter of the said type can serve for the operation of secondary loads with a corresponding voltage requirement, such as for example an air-conditioning system of the vehicle or an air-conditioning compressor as well as a TV set. This is possible in particular even when the vehicle, in particular an internal combustion engine of the vehicle, is not operated and thus the fuel cell system ensures a corresponding supply of the loads. The further additional voltage converter can additionally make available a usual domestic voltage in order to operate for example a TV set, a coffee maker etc.

It is clear that the values of the respective voltages or voltage levels stated here do not constitute any restrictions of the present invention. Other values of the respective voltages are thus also conceivable. Furthermore, the respective voltage can also be an a.c. voltage without leaving the scope of this invention.

Such an arrangement can also be part of a stationary system. In this case, the system battery, as already mentioned, in particular serves for the independent starting of the fuel cell system and for the purpose of rendering the system voltage suppliable to the electrodes of the fuel cell, in particular as protective voltage.

The starting operation of the fuel cell system can be optimized if the fuel cell system comprises an additional burner which produces a warm additional burner exhaust gas. The heat of the additional burner exhaust gas is in particular suppliable to a reformer of the fuel cell system, in particular during the staring operation or during a cold start.

In an advantageous further development, the fuel cell system comprises the reformer for generating and supplying a reformat gas, which is suppliable to the anode side by means of a reformat gas line. For transferring the heat of the additional burner exhaust gas to the reformer, the fuel cell system additionally comprises a reformer supply device. To this end, the reformer supply device is coupled to the reformer in particular in a heat-transferring manner. The heat transfer does not necessarily take place through the additional burner exhaust gas entering the reformer. The heat transfer can also be realized in that the additional burner exhaust gas flows past or around the reformer.

In a preferred embodiment, the reformer supply device comprises an inflow and a return. The inlet of the reformer supply device serves for supplying the additional burner exhaust gas to the reformer, while the return of the reformer supply device serves for returning the additional burner exhaust gas from the reformer. To this end, the inflow and the return are practically fluidically connected to one another, wherein this connection is preferentially realized in the region of the reformer or in the vicinity of the reformer. In this case, the supply or the discharge of the additional burner exhaust gas to or from the reformer does not necessarily mean that the additional burner exhaust gas enters the reformer. Preferred are embodiments, in which the additional burner exhaust gas flows past the outside of the reformer, i.e. in particular past a housing of the reformer. Thus, a possible realization is to form the inlet and/or the return of the reformer supply device in particular in the region of the reformer in the manner of a hose, arranging it on the reformer in a covering manner.

According to a further preferred embodiment, the reformer is at least partially surrounded by a through-flow capable heating jacket. The reformer is consequently and at least partially covered by the through-flow capable heating jacket. The heating jacket furthermore is coupled to the reformer in a heat-transferring manner. To this end, the heating jacket is for example formed by a hollow body covering the reformer, wherein a wall of the heating jacket which is adjacent to the reformer contacts the reformer. Alternatively, an embodiment is conceivable, in which the housing of the reformer, in particular an outer wall of the reformer, forms an inner wall of the heating jacket. For realizing the through-flow capability, the heating jacket comprises at least one opening, which serves as an inlet and/or an outlet.

The heating jacket is preferentially fluidically separated from the reformer. This means that a path of the additional burner exhaust gas heating the reformer is fluidically separated from a path of the reformat gas. This fluidic separation in this case also applies to educt feeds to the reformer. This means in particular that a fuel supply to the reformer or an oxidant gas supply to the reformer is in each case fluidically separated from the reformer supply device.

In an advantageous further development, the reformer supply device is fluidically connected to the through-flow capable heating jacket and thus transfers the heat of the additional burner exhaust gas to the reformer. To this end, the inflow and the return of the reformer supply device for example are fluidically connected to the through-flow capable heating jacket. These connections are preferentially realized via two openings of the heating jacket. This means that the inflow is fluidically connected to a first opening and the return is fluidically connected to a second opening. The additional burner exhaust gas thus flows to the reformer or to the heating jacket via the inflow and via the return away from the reformer or from the heating jacket, by way of which a heat transfer to the reformer is ensured. If the openings of the reformer and thus the fluidic connections of the inflow or the return with the heating jacket are additionally arranged on opposite sides of the heating jacket, this results in an improved heat transfer on the reformer, since a path of the additional burner exhaust gas within the heating jacket is enlarged or maximized. To this end, the heating jacket, in particular the cavity of the heating jacket, can be expanded with guiding elements which define a predetermined path of the additional burner exhaust gas. Obviously, the heating jacket can also comprise a plurality of first openings and/or a plurality of second openings, each of which are fluidically connected to the inflow or the return.

For feeding a cathode gas or a fuel cell air to the cathode side of the fuel cell, the fuel cell system with a further embodiment comprises a fuel cell air line. In order to render the heat of the additional burner exhaust gas also suppliable to the cathode gas, the fuel cell system with a preferred embodiment comprises an additional burner heat transfer device. The additional burner heat transfer device is coupled in a heat-transferring manner to an additional burner exhaust line or simply additional exhaust line or arranged within the additional exhaust line and additionally connected to the fuel cell air line in a heat-transferring manner. The additional exhaust line serves for discharging the additional burner exhaust gas produced by the additional burner. The additional exhaust line accordingly discharges in particular a part of the additional burner exhaust gases, which is not utilized for heating the reformer and/or the additional burner exhaust gas returned from the reformer.

In a further preferred embodiment, the reformer in its interior comprises a mixing chamber and a catalytic converter adjacent to the mixing chamber. In the mixing chamber, a reformer fuel is mixed with reformer air and combusted or preheated, while the conversion of the mixture into the reformat gas by means of the catalytic converter takes place. Practically, the mixing chamber is arranged upstream of the catalytic converter. Preferably, the heating jacket surrounds the reformer in the region of the catalytic converter and thus warms or heats predominantly the catalytic converter. Consequently, the mixing chamber during the process is heated through the heat transfer from the catalytic converter or through the heat transfer of the region surrounding the heating jacket.

According to a further embodiment, a mixing jacket surrounds the reformer in the region of the mixing chamber. The mixing jacket is additionally fluidically connected to a reformer air line for supplying the reformer with reformer air. The mixing jacket serves for the preconditioning of the reformer air and is practically fluidically connected to the reformer, in particular the mixing chamber. This fluidic connection is realized by means of at least one mixing jacket outlet, which is arranged on the inside of the mixing jacket facing the reformer or the mixing chamber. Accordingly, the fluidic connection can be realized with the reformer air line on the outside of the mixing jacket facing away from the reformer or from the mixing chamber. Preferably, the mixing jacket comprises a plurality of mixing jacket outlets, which are evenly distributed along the circumferential direction of the reformer or of the mixing chamber, so that the reformer air evenly or homogenously flows into the mixing chamber.

In its interior, the reformer can also comprise an evaporator space, which is arranged on the side of the mixing chamber facing away from the catalytic converter or upstream of the mixing chamber. The evaporator space serves for evaporating the mostly liquid fuel and is practically fluidically connected to a fuel line for supplying the fuel to the reformer.

Preferred is an embodiment, in which the inflow of the reformer supply device on the one hand is fluidically connected to the additional exhaust line and on the other hand to the through-flow capable heating jacket covering the reformer. The fluidic connection to the additional exhaust line is preferentially realized upstream of the additional burner heat transfer device, wherein the term upstream in this case is given here with respect to the flow direction of the additional burner exhaust gas within the additional exhaust line. The inflow of the reformer supply device thus conducts the additional burner exhaust gas upstream of the additional burner heat transfer device to the reformer. Alternatively or additionally, the return of the reformer supply device is fluidically connected on the one hand to the heating jacket and fluidically connected on the other hand to the additional exhaust line. The fluidic connection between the return and the additional exhaust line is preferentially realized downstream of the additional burner heat transfer device. The return thus conducts the additional burner exhaust gas, in particular the additional burner exhaust gas supplied from the inflow, from the heating jacket or from the reformer back to the additional exhaust line. In the process, embodiments are preferred, in which both the return as well as the inflow of the reformer supply device are realized in such a manner.

In an advantageous further development, the heat of the additional burner exhaust gas can be supplied to the fuel cell. To this end, the fuel cell system can comprise a branch, which branches the additional burner exhaust gas off the additional exhaust line, then conducting it back to the additional exhaust line. The branch is additionally coupled to the fuel cell in a heat-transferring manner. This heat-transferring coupling is realized for example by means of an end plate or termination plate of the fuel cell, which terminates the fuel cell and is coupled to the branch in a heat-transferring manner.

The branching-off or return of the additional burner exhaust gas through the branch does not necessarily take place directly from the additional exhaust line. In particular, the branch-off and/or the return can take place via the reformer supply device.

In a further embodiment, the fuel cell system in addition to said fuel line comprises a further fuel line, which supplies the additional burner with an additional burner fuel.

The fuels of the reformer and of the additional burner can generally be different. However, preferred is an embodiment, in which the reformer fuel and the additional burner fuel are identical. Consequently, the reformer and the additional burners use or convert the same fuel. Practically and preferentially, the common fuel in this case can be taken from a common container, in particular a tank or a pressure vessel. The fuel additionally corresponds preferably to the fuel of an internal combustion engine of a vehicle in or on which the fuel cell system is arranged.

The same applies to an air supply line for supplying the additional burner with air as oxidant gas. This means, the oxidant gas of the additional burner and the reformer air are identical and in particular air. In addition, the supply of the air to the additional burner or to the reformer can take place through a common conveying device, for example a pump.

It is pointed out that the additional burner can be practically regulatable or controllable. The additional burner is thus operable in particular when required. Thus, the transfer of the heat of the additional burner exhaust gas to the reformer takes place merely when required, in particular during the starting operation of the fuel cell system. Accordingly, the additional burner can be switched off during a normal operation of the fuel cell system. In particular, a control device can be provided which controls or regulates the additional burner. It is conceivable to additionally or optionally arrange a valve in the reformer supply device, which regulates a metering of the flow of the additional burner exhaust gas to the reformer, in particular to the heating jacket.

According to an operating method for the cold start of the fuel cell system, residual gas, which is contained in gas-carrying components of the fuel cell system, can be circulated from the anode side of the fuel cell to the reformer and from the reformer to the anode side, in particular for as long as the anode or anode side of the fuel cell is located below an anode limit temperature. In other words, in a section of the fuel cell system, residual gas is conveyed in a circuit between the reformer and the anode side of the fuel cell. Since the fuel cell air which is preheated with the help of the additional burner heats up the cathode side of the fuel cell, this automatically produces a heating-up of the anode side as well, so that a heat transfer to the residual gas conveyed in the circuit takes place as well. This circulating residual gas transports the heat to the transformer where it causes a preheating of the reformer and in particular of the catalytic converter of the reformer.

The starting procedure introduced here thus simultaneously realizes a preheating of the fuel cell and of the reformer with the help of the additional burner. Because of this, the reformer becomes more quickly ready for operation which shortens the starting procedure as a whole, wherein at the same time a material-saving procedure is realized in order to be able to avoid damaging the individual components due to elevated thermal loading.

By using the additional burner, a residual gas burner can for example be designed for a rated operation of the fuel cell, since the additional burner can be switched off at the end of the cold start operation. Consequently, an improved efficiency is obtained for the rated operation of the fuel cell system.

According to an advantageous embodiment, the reformer can be operated at least temporarily in a reformer operating state before reaching a predetermined (first) anode limit temperature, which for example can be around approximately 250° C. Such a reformer operation can be realized for example at an adequately high temperature in that the reformer is temporarily supplied with fuel and reformer air at an appropriate fuel/air ratio. In this way, oxygen contained if appropriate in the continuously circulating residual gas can be converted or consumed. It is important that during this temporary reformer operating state of the reformer, the residual gas continues to be circulated in a circuit between anode side and reformer. In this way, the entire oxygen gas contained in the residual gas can be reliably consumed. This temporary reformer operating state is carried out in order to be able to continue circulating the residual gas in the circuit even with rising temperatures, without damage to the anode of the fuel cell occurring. At higher temperatures, for example from 300° C., the danger of a lasting damage of the anode through a contact with oxygen is increased significantly.

In the case that a warm start of the reformer with immediate reformer operating state should not be possible, a cold start of the reformer has to be carried out, during which it is initially operated in a burner operating state. According to a further development of the starting procedure introduced here, the reformer can thus be operated in a burner operating state that is below a predetermined limit temperature of the catalytic converter of the reformer, wherein the reformer is supplied with reformer air and reformer exhaust gas formed in the reformer is discharged via the exhaust line. The reformer then serves as additional heat source, namely as an additional burner for heating up the catalytic converter. As soon as the catalytic converter limit temperature is then reached, which can be between 350° C. and 900° C., the operation of the reformer can be converted to the reformer operating state.

For as long as the temperature on the anode side is below a re-oxidation limit, which can for example be at approximately 300° C., the gas coming from the reformer can be conducted through the anode side. Optionally, the gas coming from the reformer can be conducted through the exhaust line subject to bypassing the anode side, as a result of which a contact of the anode with the oxygen carried along in the gas coming from the reformer can be avoided.

Independently of whether the reformer exhaust gas flows through or bypasses the anode side, the reformer exhaust gas can be used for preheating fuel cell air.

As soon as the catalytic converter of the reformer has reached its predetermined operating temperature, which for example is around 900° C., the reformer can be operated particularly effectively in its reformer operating state. The reformat gas usually contains no oxygen and can be conducted through the anode side, which additionally results in a heating-up of the fuel cell. In addition to this, the reformat gas can be converted in the residual gas burner together with the fuel cell air discharged from the cathode side, i.e. combusted, as a result of which further heat is liberated, which can be utilized for preheating the fuel cell air.

The additional burner can now be deactivated as soon as the residual gas burner takes over the preheating of the fuel cell air or as soon as a predetermined (second) anode limit temperature or anode operating temperature is reached.

In another embodiment it can be provided to again switch off the reformer on reaching a predetermined further (third) anode limit temperature and to continue circulating the residual gas that is now free of oxygen between anode side and reformer. This third anode limit temperature is significantly below the second anode limit temperature or below the anode operating temperature. The third anode limit temperature however is also above the first anode limit temperature. Below the anode operating temperature, which can be around 650° C., there is the risk of soot formation or soot deposits on the anode of the fuel cell. By switching off the reformer, this risk can be substantially reduced since the temperature range that is critical for the soot formation is bypassed.

According to an advantageous further development, the reformer can then be switched on again on reaching a predetermined further (fourth) anode limit temperature and immediately operated in the reformer operating state. At any rate, the fourth anode limit temperature is higher than the third anode limit temperature. The third anode limit temperature can for example be around 350° C. The fourth anode limit temperature can be around approximately 650° C. It can therefore be selected in particular as high as the previously mentioned second anode limit temperature or as the anode operating temperature. The renewed switching-on of the reformer in the presence of the fourth anode limit temperature makes possible a warm start of the reformer, i.e. an immediate operation of the reformer in the reformer operating state. At the comparatively high temperatures present now, the risk of the soot formation or soot deposit on the anode is substantially reduced.

As soon as the anode side or the fuel cell then reaches a minimum temperature, the fuel cell can be put into service. The starting procedure is then terminated.

According to another advantageous embodiment, air, for regulating a temperature of the fuel cell, can be directed from a bypass air line, which bypasses the residual gas heat transfer device arranged in the fuel cell air line, via a bypass line, which bypasses the additional heat transfer device in the bypass air line, can be conducted into the fuel cell air line downstream of the residual gas heat transfer device. The residual gas heat transfer device can interact with the exhaust gas flow of the residual gas burner in order to heat up the fuel cell air. The additional heat transfer device can interact with the additional burner in order to preheat the fuel cell air with the hot additional burner exhaust gas. Should it be required to reduce or limit a temperature of the fuel cell, for example the temperature of the electrolyte or a cathode temperature or an anode temperature in order to avoid overheating of the respective component of the fuel cell it is now possible subject to bypassing both heat transfer devices to supply cooling air sucked in from the surroundings while bypassing both heat transfer devices to the fuel cell on the cathode side. This is made possible with the help of the bypass line, which connects the bypass air line to the fuel cell air line between the two heat transfer devices.

It is to be understood that the fuel cell system with the system battery even as such belongs to the scope of this invention.

It is noted, furthermore, that a reformer with a heating jacket of said type for a fuel cell system of this type also belongs to the scope of this invention as such. The reformer can additionally comprise a mixing jacket and/or an evaporator space of said type.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 2 is a circuit diagram-like and highly simplified embodiment of a fuel cell system.

DESCRIPTION OF THE PREFERRED EMBODIMENTS

Figure 1:
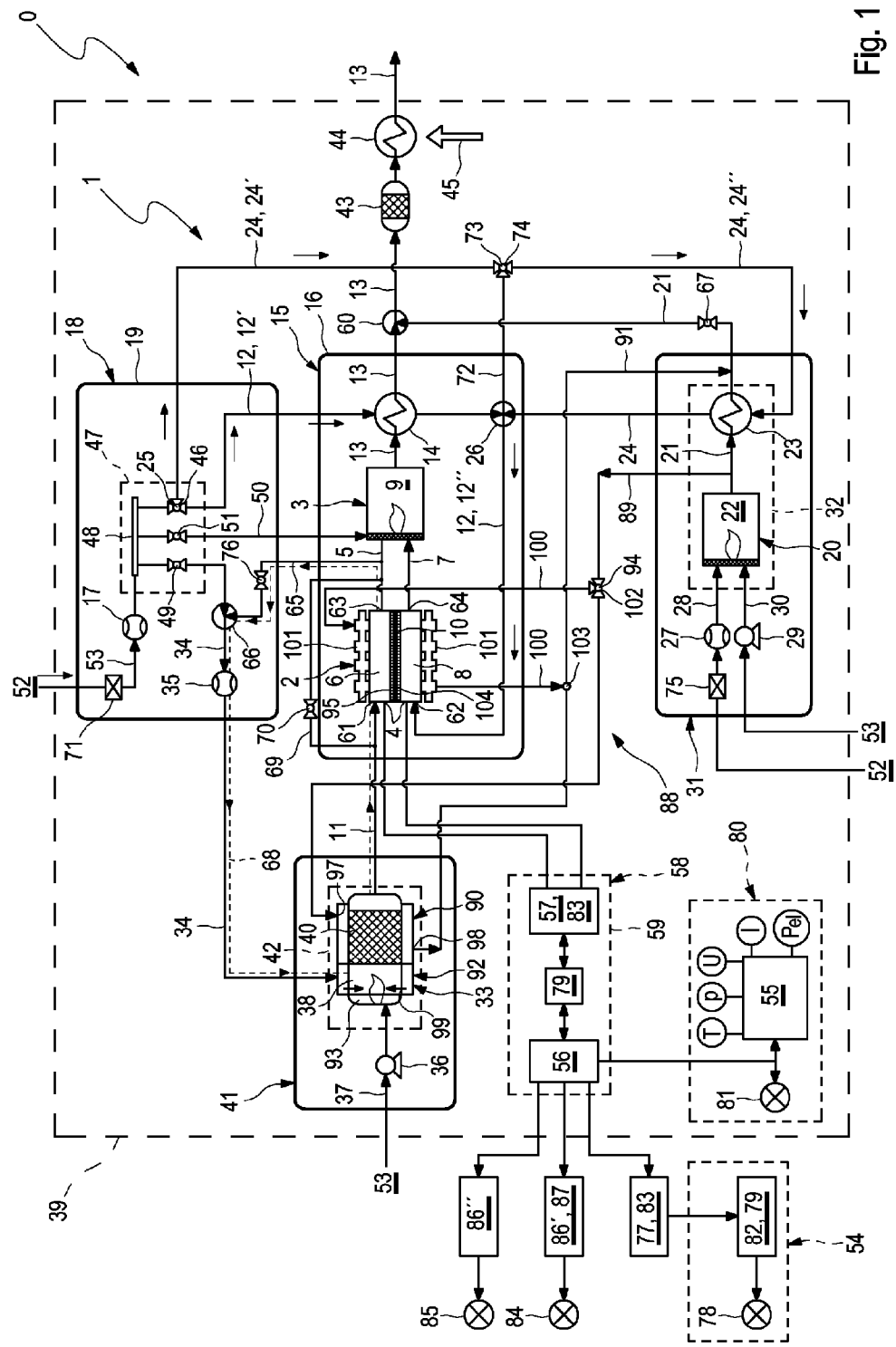
FIG. 1 is a circuit diagram-like and highly simplified embodiment of an arrangement with a fuel cell system and electrical loads.

Referring to the drawings in particular, FIG. 1 shows an arrangement 0 having a fuel cell system 1, which can be arranged in a motor vehicle or in any other mobile or stationary application as a sole or additional electrical source of energy, with a fuel cell 2 and a residual gas burner 3. The fuel cell 2 during operation generates electric current from anode gas and cathode gas, which can be tapped off via electrodes 4. The fuel cell 2 is preferably configured as a SOFC-fuel cell. The residual gas burner 3 during operation converts anode exhaust gas with cathode exhaust gas, generating burner exhaust gas in the process. The conversion in this case can be effected with an open flame. A catalytic conversion is likewise conceivable.

An anode exhaust line 5 connects an anode side 6 of the fuel cell 2, which comprises at least one anode 95, to the residual gas burner 3. A cathode exhaust line 7 connects a cathode side 8 of the fuel cell 2, which comprises at least one cathode 104, to the residual gas burner 3. In a combustion chamber 9 of the residual gas burner 3, the conversion of the fuel cell exhaust gases then takes place. The residual gas burner 3 can form a structurally integrated unit with the fuel cell 2. The anode exhaust line 5 and the cathode exhaust line 7 are then internal lines or paths.

In the fuel cell 2, an electrolyte 10 separates the anode side 6 from the cathode side 8. The supply of anode gas to the anode side 6 of the fuel cell 2 takes place via a reformer gas line 11 or an anode gas line 11. The supply of cathode gas to the cathode side 8 of the fuel cell 2 takes place via a fuel cell air line 12. The cathode gas is preferably air. A burner exhaust line 13 discharges the burner exhaust gas generated by the residual gas burner 3 from the residual gas burner 3 or from its combustion chamber 9. In this burner exhaust line 13, a residual gas heat transfer device 14 is incorporated, which additionally is incorporated in the fuel cell air line 12. The residual gas heat transfer device 14 generates a media-separated heat-transferring coupling between the fuel cell air line 12 and the burner exhaust line 13. The residual gas heat transfer device 14 in this case can be structurally integrated in the residual gas burner 3.

In the example, the fuel cell system 1 is equipped with a fuel cell module 15, which comprises the fuel cell 2, the residual gas burner 3 and the residual gas heat transfer device 14. Furthermore, this fuel cell module 15 is equipped with a thermally insulating cover 16, which encloses the components of the fuel cell module 15.

The fuel cell system 1 is additionally equipped with an air conveying device 17, which can for example be a blower or a compressor or an electrically operated turbocharger or a pump. During the operation, this air conveying device 17 feeds air as cathode gas to the fuel cell 2 via the fuel cell air line 12. The air conveying device 17 in this case is part of an air supply module 18, which comprises its own thermally and/or acoustically insulating cover 19, in which the air conveying device 17 is arranged. The air conveying device 17 can preferentially be equipped with a filtering device 71 in order to filter particles and/or aerosols out of the conveyed air.

The fuel cell system 1 is additionally equipped with an additional burner device 20 or an additional burner 20, which is configured so that during operation it converts air with an additional burner fuel or simply fuel into additional burner exhaust gas. Said additional burner exhaust gas in the process is discharged from the additional burner 20 or from a combustion chamber 22 of the additional burner 20 via an additional burner exhaust line 21 or briefly additional exhaust line 21. The additional exhaust line 21 preferentially contains a shut-off device 67 for decoupling the additional burner 20 during a normal operation of the fuel cell system 1, during which the additional burner 20 is switched off. The shut-off device 67 then functions as a non-return valve. In this additional exhaust line 21, an additional burner heat transfer device 23 or briefly additional heat transfer device 23 is incorporated. Apart from this, the additional heat transfer device 23 is incorporated in a bypass air line 24. The additional heat transfer device 23 thus generates a media-separated, heat-transferring coupling between the additional exhaust line 21 and the bypass air line 24. The additional heat transfer device 23 in this case can be structurally integrated in the additional burner 20.

The bypass air line 24 bypasses the residual gas heat transfer device 14 on the air side. For this purpose, the bypass air line 24 is connected to the fuel cell air line 12 on the inlet side via a tapping point 25 between the air conveying device 17 and the residual gas heat transfer device 14. On the outlet side, the bypass air line 24 is connected to the fuel cell air line 12 via an input line 26 between the residual gas heat transfer device 14 and the fuel cell 2. A first portion of the fuel cell air line 12, which leads from the air conveying device 17 to the input point 26 is designated 12' in the following, while a second portion of the fuel cell air line 12 leading from the input point 26 to the fuel cell 2 or to the cathode side 8 is designated 12" in the following.

According to the embodiment shown here, a bypass line 72 can be optionally provided, which connects a tapping point 73 of the bypass air line 24 arranged upstream of the additional heat transfer device 23 to the input point 26, i.e. to the fuel cell air line 12. This bypass line 72 because of this makes possible bypassing the additional heat transfer device 23 within the bypass air line 24. A first portion of the bypass air line 24, which leads from the tapping point 25 as far as to the further tapping point 73, is designated 24' in the following, while a second portion of the bypass air line 24 leading from the further tapping point 73 as far as to the input point 26 is designated 24" in the following. For controlling the bypass line 72, a further valve 74 can be provided, which in the example is practically arranged on the further tapping point 73.

During the normal operation of the fuel cell system 1, i.e. with the additional burner 20 switched off, preheating of the fuel cell air takes place exclusively via the residual gas heat transfer device 14. In certain operating situations it can be required to avoid a further temperature increase of the fuel cell 2 or achieve a cooling of the fuel cell 2. This can be required for example in order to protect a component of the fuel cell 2, such as for example the electrolyte 10, from overheating. The respective temperature or the fuel cell 2 can be regulated through cold ambient air, which is fed to the fuel cell air in order to reduce the temperature of the latter. The cold ambient air in this case can be fed to the second portion 12" of the fuel cell air line 12 via the bypass air line 24, wherein the bypass air line 24 bypasses the residual gas heat transfer device 14. If, however, during the starting operation, the additional burner 20 is still active, the additional heat transfer device 23 which is arranged in the bypass air line 24 also has to be bypassed in order to be able to achieve a cooling of the fuel cell air. The bypass line 72 is used for this purpose. The cooling air then flows via the first portion 24' of the bypass air line 24 as far as to the bypass line 72 and from the bypass line 72 into the second portion 12' of the fuel cell air line 12. Because of this, the cooling air on the one hand bypasses the residual gas heat transfer device 14 and on the other hand the additional heat transfer device 23.

The supply of the additional burner 20 with air is carried out via an additional air conveying device 27 and a corresponding air supply line 28. The additional conveying device 27 can preferentially be equipped with a filtering device 75, in order to filter particles and/or aerosols out of the conveyed air. The air for the additional burner 20 in the process is preferably sucked in from surroundings 52 of the fuel cell system. The additional burner 20 is supplied with fuel with the help of a fuel conveying device 29 via a suitable fuel line 30. The fuel can for example be any hydrocarbons. However, a fuel with which for example an internal combustion engine of the vehicle equipped with the fuel cell system 1 can also be operated is preferred. The fuel is thus diesel or biodiesel or heating oil in particular. Petrol or natural gas or any biofuel as well as synthetic hydrocarbons are also conceivable. Consequently, the fuel line 30 is practically connected to a fuel tank 53 of the vehicle which is not shown in more detail here.

The additional burner 20 and the additional heat transfer device 23 in this case are part of an additional burner module 31, which has its own thermally insulating cover 32, in which the additional burner 20 and the additional heat transfer device 23 are arranged. In addition, the additional air conveying device 27 and the fuel conveying device 29 of the additional burner 20 in the example are part of the additional burner module 31. These parts however are arranged outside the associated cover 32.

In the shown example, the fuel cell system 1 is additionally equipped with a reformer 33, which during the operation sub-stoichiometrically converts air during the operation with a reformer fuel or fuel, i.e. at an air ratio <1 and in the process generates hydrogen-containing and carbon monoxide-containing reformat gas. This reformat gas as anode gas is fed to the anode side 6 of the fuel cell 2 via the reformat gas line 11. To supply the reformer 33 with reformer air, a reformer air line 34 is provided, which in this case is likewise fed by the air conveying device 17. In the embodiment shown here, a further conveying device 35 is arranged in the reformer air line 34 downstream of the air conveying device 17, which in the following is described as reformer air conveying device 35. With the help of this reformer air conveying device 35, the air fed to the reformer 33 can be brought to an elevated pressure level. In addition, this reformer air conveying device 35 can be configured as a hot gas conveying device. For example, it can be configured in the manner of a blower, compressor, electrically operated turbocharger or of a pump.

To supply the reformer 33 with fuel, a fuel conveying device 36 is provided, which supplies a suitable fuel to the reformer 33 via a suitable fuel line 37. This, in turn, can be any hydrocarbon. Preferred is the fuel which is also supplied to the internal combustion engine of the vehicle equipped with the fuel cell system 1. Accordingly, the fuel line 37 provided for supplying the reformer 33 is practically also connected to the tank 53 of the vehicle.

The reformer 33 contains a combustion chamber 38 or mixing chamber 38, in which the reformer air and the fuel are mixed and combusted. The reformer 33 additionally contains a catalytic converter 40, with the help of which the reformat gas can be generated with the help of partial oxidation.

The reformer 33 is part of a reformer module 41, which comprises a separate or own thermally insulating and/or gas-tight cover 42, in which the reformer 33 is arranged. In the example, the reformer fuel conveying device 36 belongs to the reformer module 41. However, said conveying device 36 for this purpose is arranged outside the cover 42 of the reformer module 41.

The burner exhaust line 13 or briefly exhaust line 13 contains an oxidation catalytic converter 43 downstream of the residual gas heat transfer device 14 for the exhaust gas retreatment. In the exhaust line 13, a heating heat transfer device 44 can be additionally incorporated, which during the operation can heat up a fluid flow 45 indicated by an arrow. This can be an air flow 45, which is fed to a vehicle interior which is not shown here. Alternatively, the fluid flow 45 can also be a coolant of a cooling circuit, wherein the cooling circuit contains a heat transfer device for heating an air flow, which can then be conducted for example to the vehicle interior. The heating heat transfer device 44 in this case is practically arranged downstream of the oxidation catalytic converter 43. Because of this, the heat which in the oxidation catalytic converter 43 is liberated if appropriate during the conversion of pollutants can be utilized for heating the vehicle interior.

The tapping point 25, at which the bypass air line 24 branches off the fuel cell air line 12, is practically configured as a valve or arranged on a valve 46. This valve 46 makes possible for example quasi any distribution of the air flow conveyed by the air conveying device 17 over the portion of the fuel cell air line 12 conducted through the residual gas heat transfer device 14 and over the bypass air line 24. The valve 46 is practically part of a valve device 47, which via a distribution strip 48, distributes the air conveyed by the air conveying device 17 on the pressure side over the fuel cell air line 12 and over the reformer air line 34. For controlling the air rate fed to the reformer 33, a further valve 49 can be provided, which can likewise belong to the valve device 47. Furthermore, a cooling gas line or cooling air line 50 is provided in the example, via which cooling air can be fed to the residual gas burner 3. The cooling air line 50 is controllable with a valve 51, which in the example likewise belongs to the valve device 47. The air conveying device 17 likewise sucks the air from the surroundings 52 of the fuel cell system 1 via a suction line 53. The valve device 47 in the example is likewise a part of the air supply module 18 and arranged within the associated cover 19.

The valves of the valve device 47 and the air conveying devices 17, 35 are preferably temperature-controlled or temperature-regulated. For example, the valve 49, the conveying device 17 and the reformer air conveying device 35 are regulated dependent on the temperature of the mixing chamber 38 and/or depending on the temperature of the catalytic converter 40. The valve 51 and the air conveying device 17 can be regulated for example dependent on the temperature of the combustion chamber 9. The valve 46 and the air conveying device 17 can for example be regulated dependent on the temperature of the cathode side 8. The air conveying device 35 can for example be regulated dependent on the temperature of the mixing chamber 38 and/or dependent on the temperature of the catalytic converter 40.

The electrical current generated with the help of the fuel cell system 1 practically serves for supplying electrical loads with electric current or with electrical energy. In this case, the arrangement 0 comprises a load system 54, which comprises a load network battery 82 and first loads 78, which is electrically supplied via a load network voltage of the load network battery 82. The arrangement 0 can for example be part of a vehicle, in particular of a motor vehicle. In this case, the load system 54 for example corresponds to the vehicle's electrical system 54 while the load network battery 82 corresponds to an electrical system battery 82 of the vehicle. The load network voltage of the load network battery 82 is at a load network voltage level, which in the case of a vehicle can for example amount to 12V. The first loads 78 are for example control units, light bulbs and a radio of the vehicle.

On the electrodes 4 of the fuel cell 2, a cell voltage at a cell voltage level can be tapped off. The cell voltage level in the shown embodiment is for example around 42V and can, in particular dependent on a loading of the fuel cell 2, fluctuate for example between 36V and 60V. The cell voltage level however can have any value in particular dependent on the type and the loading of the fuel cell 2.

The fuel cell system 1 is additionally equipped with an energy storage unit 56 designed as a system battery 56, across which there is a system voltage at a system voltage level, wherein the system voltage level for example has a value of 24V. The system battery 56 in particular serves the purpose of storing the cell voltage generated by the fuel cell 2 or an electrical energy connected therewith. To this end, a charging device 79 is electrically connected to the system battery 56. Supplying the cell voltage of the fuel cell 2 to the system battery 56 or to the charging device 79 is effected via a voltage converter device 57 of the fuel cell system 1. The voltage converter device 57 to this end is arranged between the fuel cell 2 and the system battery 56 or the charging device 79 and is electrically connected to these. In order to render the cell voltage of the fuel cell 2 suppliable to the system battery 56, the voltage converter device 57 converts the cell voltage at the cell voltage level to the system voltage which is on the lower system voltage level. The voltage converter device 57 thus converts for example the cell voltage of 42V into a voltage of 24V, which corresponds to the system voltage. In order to render the system voltage across the system battery 56 also suppliable to the fuel cell 2, in particular to the electrodes 4 and to the anode 95 of the fuel cell 2, the voltage converter device 57 is additionally designed accordingly. In this case, the voltage converter device 57 is able if required to convert the system voltage at the system voltage level into another voltage in another voltage level, subsequently supplying it to the fuel cell 2. This serves the purpose of protecting in particular the anode 95 from oxidation. The oxidation in this case is particularly relevant in oxidizing conditions on the anode side 6, wherein the fuel cell system 1 on the one hand can comprise a device for determining the relevant conditions and on the other hand is preferentially designed in such a manner that the electrical voltage to be present across the electrodes 4 is regulatable.

The system voltage across the system battery 56 is additionally suppliable to system loads 80 of the fuel cell system 1. This means that the system battery 56 functions as an electrical buffer or as an electrical storage unit, via which the electrical supply of system loads 80 is effected. System loads 80 are for example the conveying devices 17, 27, 29, 35, 36, the valves 46, 49, 51, 67, 74, 76 as well as ignition devices such as for example glow pins and sparkplugs, with which in the residual gas burner 3, in the additional burner 20 and in the reformer 33 a combustion reaction can be initiated. Likewise, a control device 55, with the help of which the individual components of the fuel cell system 1, for example as a function of temperatures, pressures, electrical currents etc. of the fuel cell system, can be actuated, represent a system load 80 of the fuel cell system 1, wherein the system loads 80 are operated at the system voltage level, i.e. for example at 24V. The electrical energy of the system battery 56 stored in the form of the system voltage can be utilized in particular for starting the fuel cell system 1 without external electrical energy or voltage supply.

In order to render the system voltage across the system battery 56 also suppliable or utilizable for the load system 54, in particular for the load network battery 82 of the load system 54, a load voltage converter 77 is additionally provided, which converts the system voltage of the system battery 56 at the system voltage level to the vehicle's electrical system voltage or load network voltage at the load network voltage level, supplying it to the load network battery 82. In the shown embodiment, the load network voltage level is lower than the system voltage level. The load voltage converter 77 is consequently designed as a step-down converter and reduces the system voltage level to the load network voltage level. To supply first loads 78 of the load system 54 with the system voltage, a charging device 79 is additionally arranged on the load network battery 82, wherein the charging device 79 in the shown example is integrated in the load network battery 82. The load network battery 82 thus functions similarly to the system battery 56 as a buffer or storage unit, via which an electrical supply of the first loads 78 is effected. The cell voltage generated by the fuel cell 2 and the system voltage across the system battery 56 and the system network voltage of the load system 54 are usually d.c. voltages. This means that the polarity of these voltages does not change over time. Practically, the voltage converter device 57 and the load voltage converter 77 each comprise a d.c. voltage converter 83.

To supply electrical secondary loads 84, 85, which are operated with an additional voltage on at least one additional voltage level, through the system battery 56, at least one additional voltage converter 86 is additionally provided. In the shown embodiment, two additional voltage converters 86', 86" are provided, which convert the system voltage level to two different additional voltage levels, wherein both additional voltage levels are higher than the system voltage level. The additional voltage converters 86', 86" are thus designed as step-up converters 86', 86".

The first additional voltage converter 86' converts the system voltage of the system battery 56 on the system voltage level to the first additional voltage on the higher first additional voltage level. As secondary loads 84, in particular external electrical loads, for example a refrigerator, a cooler box, a TV set and a coffee maker which usually require an additional voltage level of 110V or 220V and are additionally operated with an a.c. voltage are mentioned here. To this end, the first additional voltage converter 86' comprises an inverter 87. The first additional voltage converter 86' thus additionally converts the d.c. voltage-like system voltage of the system battery 56 into the a.c. voltage-like first additional voltage in addition to increasing the system voltage to the first additional voltage level, making this a.c. voltage-like first additional voltage available to the relevant electrical secondary loads 84.

The second additional voltage converter 86" converts the system voltage of the system battery 56 on the system voltage level into a second additional voltage level, wherein the thus converted voltage for example corresponds to a high voltage, i.e. a voltage higher than 300V. Thus, the second additional voltage level is higher than the first additional voltage level of the first additional voltage converter 86'. As secondary loads 85 on the second additional voltage level made available by the second additional voltage converter 86", air-conditioning devices, in a vehicle therefore in particular an air-conditioning system of the vehicle, are electrically supplied for example.

The additional exhaust line 21 in the embodiments shown here is connected to the exhaust line 13 via an input point 60, namely downstream of the residual gas heat transfer device 14. In this case, this input point 60 is practically positioned so that it is located upstream o the oxidation catalytic converter 43. Because of this, the residual heat of the additional burner exhaust gas can be utilized for heating up the oxidation catalytic converter 43. At the same time, the residual heat of the additional burner exhaust gas can be utilized for heating the heating heat transfer device 44.

The fuel cell system 1 comprises a reformer supply device 88, which is coupled to the reformer 33 in a heat-transferring manner. This heat transfer is realized via an inflow 89 of the reformer supply device 88, a heating jacket 90 through which a flow can flow and a return 91 of the reformer supply device 88. In this case, the inflow 89 on the one end is connected to the additional exhaust line 21 upstream of the additional heat transfer device 23 and on the other end is fluidically connected to the heating jacket 90 via a first opening 97 of the heating jacket 90. The heating jacket 90 is designed in a manner to allow a through-flow and is coupled to the reformer 33 in a heat-transferring manner. In addition, the heating jacket 90 is fluidically separated or isolated from the reformer 33. The through-flow capable heating jacket 90 additionally comprises a cavity which is fluidically connected to the first opening 97. The additional burner exhaust gas conducted via the inflow 89 from the additional exhaust line 21 to the heating jacket 90 thus flows through the first opening 97 into the heating jacket 90, in particular into the cavity of the heating jacket 90, without entering the reformer 33 in the process. Furthermore, the return 91 of the reformer supply device 88 is fluidically connected to the heating jacket 90 on the one end through a second opening 98 of the heating jacket 90 and on the other end is fluidically connected to the additional exhaust line 21 downstream of the additional heat transfer device 23. The additional burner exhaust gas of the additional burner 20 which flowed through the inflow 89 into the heating jacket 90, in particular into the cavity of the heating jacket 90, consequently flows through the return 91 of the reformer supply device 88 back to the additional exhaust line 21. Thus, the heating jacket 90, in particular the cavity of the heating jacket 90, is subjected to the through-flow of warm additional burner exhaust gas and the heat of the additional burner exhaust gas of the additional burner 20 transferred to the reformer 33. A shut-off device 94 for decoupling the additional burner 20 from the heating jacket 90 during the normal operation of the fuel cell system 1 is additionally arranged in the inflow 89.

The heating jacket 90 surrounds the reformer 33 in the region of the catalytic converter 40. The first opening 97 of the heating jacket 90 is, as is visible in the section of FIG. 2, arranged on the side of the heating jacket 90 facing away from the mixing chamber 38, while the second opening 98 is arranged on the side of the heating jacket 90 facing the mixing chamber 38, so that the additional burner exhaust gas circulates in the heating jacket 90 and has as long as possible a flow path. The mixing chamber 38 is surrounded by a mixing jacket 92 adjacent to the heating jacket 90. The mixing jacket 92 comprises a cavity and is fluidically connected to the reformer air line 34 on its side facing away from the reformer 33, while on its side facing the reformer 33 it comprises mixing jacket outlets 99, which fluidically connect the mixing jacket 92 to the mixing chamber 38. Thus, the reformer air flows via the mixing jacket 92 into the mixing chamber 38 of the reformer 33, wherein in the mixing jacket 92 a preconditioning can take place. An even distribution of the mixing jacket outlets 99 along the circumference of the mixing jacket 92 additionally ensures the even inflow of the reformer air in the mixing chamber 38.

The reformer 33 shown here furthermore comprises an evaporator space 93, which is fluidically connected to the fuel line 37. Accordingly, the fuel flows via the evaporator space 93 into the mixing chamber 38, wherein the evaporator space 93 serves the purpose of evaporating the mostly liquid fuel prior to entering the mixing chamber 38. The evaporator space 93, the mixing chamber 38 and the catalytic converter 40 are consequently fluidically interconnected.

Additionally or alternatively, a branch 100 branched off the additional exhaust line 21 can be coupled to an end plate 101 of the fuel cell 2 in a heat-transferring manner. In the shown example, the branch 100 is connected to a tapping point 102 arranged on the valve 94 of the inflow 89 and conducts the additional burner exhaust gas to the end plate 101 and subsequently back to the return 91 of the reformer supply device 88 via an input point 103, by way of which the additional burner exhaust gas returns into the additional exhaust line 21. It is thus possible to also heat the fuel cell 2 with the help of the additional burner 20. The tapping point 102 arranged on the valve 94 in this case allows quasi any distribution of the additional burner exhaust gas for heating the reformer 33 or the fuel cell 2.

The fuel cell 2 can typically have a stack-like structure, in which a multiplicity of plate-like fuel cell elements are stacked on top of one another and because of this form a fuel cell stack or stack. On its ends, the fuel cell stack is closed off through two end plates, namely through said end plate 101 and through a further end plate. This further end plate in the example comprises an anode gas connection 61, to which the anode gas line 11 or reformat gas line 11 is connected, a cathode gas inlet 62, to which the cathode gas line 12 or fuel cell air line 12 is connected, an anode exhaust gas outlet 63, to which the anode exhaust line 5 is connected, and a cathode exhaust gas outlet 64, to which the cathode exhaust line 7 is connected. Since all educt connections are thus arranged on this further end plate, this can also be described as connection plate. In contrast with this, the other end plate 101 merely forms a termination of the fuel cell stack, so that it can also be described as termination plate.

In another embodiment, a further cover can be arranged in the thermally insulating cover 16 of the fuel cell module 15, which in particular is configured gas-tight. This inner cover can likewise have a thermally insulating effect. It is likewise conceivable to configure the outer cover 16 in a gas-tight manner. Furthermore, a cover can be sufficient if it is configured thermally insulating and gas-tight. It is now possible, in particular, to connect the previously mentioned branch 100 of the additional exhaust line 21 to an interior space of the fuel cell module 15 enclosed by the inner cover. In this case, the branch 100 opens into the said interior space at an entry point and exits from the interior space again at a distal exit point. Because of this, the fuel cell module 15 can be heated with the additional burner exhaust gas. In particular, this can be combined with the heating of the fuel cell 2. For example, the additional burner exhaust gas can be initially conducted via the branch 100 as far as to the termination plate and from the latter exit into the interior space in order to be discharged again from the interior space via the exit point.

The fuel cell system 1, in the preferred embodiment shown here, is furthermore equipped with a recirculation line, which is connected on the input side to the anode exhaust line 5 and on the output side to the reformer air line 34 via an input point 66, namely upstream of the reformer air conveying device 35. Since the recirculated anode exhaust gas during the operation of the fuel cell system 1 can have comparatively high temperatures, the reformer air conveying device 35 is practically configured for being exposed to hot gases, wherein these gases can be additionally toxic and/or explosive.

The valve device 47 in the example is configured in order to distribute the air sucked in by the air conveying device 17 over the fuel cell air line 12, the bypass air line 24, the cooling air line 50 and the reformer air line 34.

In another embodiment which is not shown, the air conveying device 17 via the valve device 47 can be additionally used for supplying the additional burner 20 with air. For this purpose, the additional burner air line 28 can be connected to a distribution strip 48 via a further valve. Alternatively, the additional air conveying device 27 in the additional burner air line 28 can also be omitted.

Additionally to the preheating of the fuel cell air with the help of the additional burner 20, a residual gas circulation in a circulation circuit 68 can also be realized during a cold start of the fuel cell system 1, in which the reformer 33 in particular also is at an ambient temperature, which circulation circuit 68 is indicated in FIG. 1 by an interrupted line.

Furthermore, an additional bypass line 69 is provided, which branches off the reformat gas line 11 and bypasses the anode side 6 of the fuel cell 2. Because of this it is possible to heat up the reformer 33 by protecting the material, without there being the risk of the anode 95 being damaged through residual oxygen from the reformer 33. In the example, this bypass line 69 is connected to the anode exhaust line 5, so that reformer exhaust gas is again introduced into the original path upstream of the residual gas burner 3. The bypass line 69 can be controlled with a corresponding valve 70. Practically, the bypass line 69 to this end is designed so that its flow resistance is lower than the flow resistant of the anode side 6 of the fuel cell 2. With open valve 70, the reformer exhaust gas, following the path of least resistance, then does not flow through the anode side 6, but through the bypass line 69. In this version, the reformer 33 can be easily operated over-stoichiometrically, since contacting of the anode side 6 with residual oxygen in the reformer exhaust gas need not be expected. This quasi random over-stoichiometric operation mode of the reformer 33 simplifies the starting operation of the reformer 33, in particular for maintaining lower temperatures.

FIG. 2 shows the fuel cell 2 of a fuel cell system 1. In order to protect electrodes 4 and the anode 95 from oxidation, the system voltage across the system battery 56 can be supplied to the fuel cell 2. In this case, the system voltage is applied to the fuel cell 2 in such a manner that a negative pole of the system battery 56 is electrically connected to the anode side 6 or the anode 95, while a positive pole of the system battery 56 is electrically connected to the cathode side 8 or the cathode 104. In addition, the respective electrical connections are not realized necessarily directly. In the present example this means that the voltage converter device 57 and the charging device 79 are connected between the system battery 56 and the electrodes 4. Such a supply of the system voltage to the fuel cell 2 functions as protective voltage, which is supplied to the fuel cell 2 when required, i.e. in particular in oxidizing conditions on the anode side 6. This can for example be controlled by means of a switch 96, which in particular is controlled by the control device 55, and establishes a corresponding electrical connection and a concomitant electric flow of an associated electric current S when required.

While specific embodiments of the invention have been shown and described in detail to illustrate the application of the principles of the invention, it will be understood that the invention may be embodied otherwise without departing from such principles.

The invention claimed is:

1. An arrangement comprising:
a fuel cell system; and
an electrical load system, wherein:
the electrical load system is for the electrical supply of first loads and comprises a load network battery with a load network voltage at a network load voltage level;
the fuel cell system comprises a fuel cell for generating an electrical cell voltage at a cell voltage level;
the fuel cell system is for supplying electrical system loads of the fuel cell system comprises a system battery with a system voltage at a system voltage level;
the network load voltage level and the system voltage level are different;
the fuel cell system comprises a voltage converter device for converting the cell voltage level to the system voltage level and/or of the system voltage level to the cell voltage level;
for supplying electrical secondary loads at least one additional voltage converter for adapting the system voltage across the system battery to at least one additional voltage level is provided;
the system voltage level and the additional voltage level are different;
for supplying the electrical load system at least one load voltage converter for adapting the system voltage across the system battery to the load network voltage level is provided.

2. The arrangement according to claim 1, wherein the voltage converter device comprises at least one d.c. voltage converter.

3. The arrangement according to claim 1 wherein the at least one additional voltage converter comprises at least one inverter.

4. The arrangement according to claim 1, wherein the load voltage converter comprises at least one d.c. voltage converter.

5. The arrangement according to claim 1, wherein the arrangement comprises an electrical charging device for charging the system battery by means of the electrical cell voltage generated by the fuel cell.

6. The arrangement according to claim 5, wherein the electrical charging device is arranged between the fuel cell and the system battery.

7. The arrangement according to claim 1, wherein the system voltage across the system battery is suppliable via the voltage converter device as a protective voltage to electrodes of the fuel cell.

8. The arrangement according to claim 7, wherein the protective voltage is regulatable dependent on thermodynamic parameters on an anode side of the fuel cell.

9. The arrangement according to claim 1, wherein at least one secondary load level is at a domestic level, in particular at 220V or 110V.

10. The arrangement according to claim 1, wherein the arrangement is part of a motor vehicle.

11. The arrangement according to claim 10, wherein the electrical load system is an electrical system of the motor vehicle and the load network battery is a network battery of the motor vehicle.

12. The arrangement according to claim 1, wherein the arrangement is part of a stationary system.

13. A fuel cell system comprising:
a fuel cell generating an electrical cell voltage at a cell voltage level, the fuel cell system for supplying electrical system loads of the fuel cell system;
a system battery with a system voltage at a system voltage level;
a connection to an electrical load system, wherein the electrical load system is for the electrical supply of first loads and comprises a load network battery with a load network voltage at a network load voltage level, wherein the network load voltage level and the system voltage level are different;
a voltage converter device for converting the cell voltage level to the system voltage level and/or of the system voltage level to the cell voltage level;
an additional voltage converter for adapting the system voltage across the system battery to at least one additional voltage level for supplying electrical secondary loads, wherein the system voltage level and the additional voltage level are different; and
a load voltage converter for adapting the system voltage across the system battery to the load network voltage level for supplying the electrical load system.

14. The fuel cell system according to claim 13, further comprising:
a reformer;
a reformer supply device;
a burner for generating burner exhaust gas, wherein the heat of the burner exhaust gas is transferred to the reformer of the fuel cell system by means of the reformer supply device.

15. The fuel cell system according to claim 14, wherein the reformer comprises a heating jacket and a mixing jacket, wherein the heating jacket surrounds the reformer in the region of a catalytic converter of the reformer while the mixing jacket surrounds the reformer in the region of a mixing chamber.

16. A fuel cell system comprising:
a fuel cell generating a cell voltage;
a first voltage converter receiving the cell voltage from said fuel cell and converting the cell voltage to a system voltage;
a system battery receiving the system voltage from said first voltage converter;
a system load connected to said system battery at said system voltage, said system load including loads powering operation of said fuel cell, said system load being powered by said system battery;
a second voltage converter receiving the system voltage from said system battery and converting the system voltage to a first load voltage;
a first load battery receiving the first load voltage from said second voltage converter;

a first load connected to said first load battery at said first load voltage and being powered by said first load battery;

the system voltage being different than the first load voltage;

said system battery being different than, and separate from, said first load battery.

17. A fuel cell system in accordance with claim 16, further comprising:

a third voltage converter receiving the system voltage from said system battery and converting the system voltage to a second load voltage, the system voltage being different than the second load voltage;

a second load connected to said third voltage converter and being powered by said third voltage converter.

18. A fuel cell system in accordance with claim 16, wherein:

the cell voltage is in a range that is higher than the system voltage.

19. A fuel cell system in accordance with claim 16, wherein:

the system voltage is higher than the first load voltage.

20. A fuel cell system in accordance with claim 17, wherein:

the cell voltage is in a range that is higher than the system voltage;

the system voltage is higher than the first load voltage;

a vehicle contains said fuel cell;

said first load powering control units of said vehicle.

* * * * *